Figure 1:
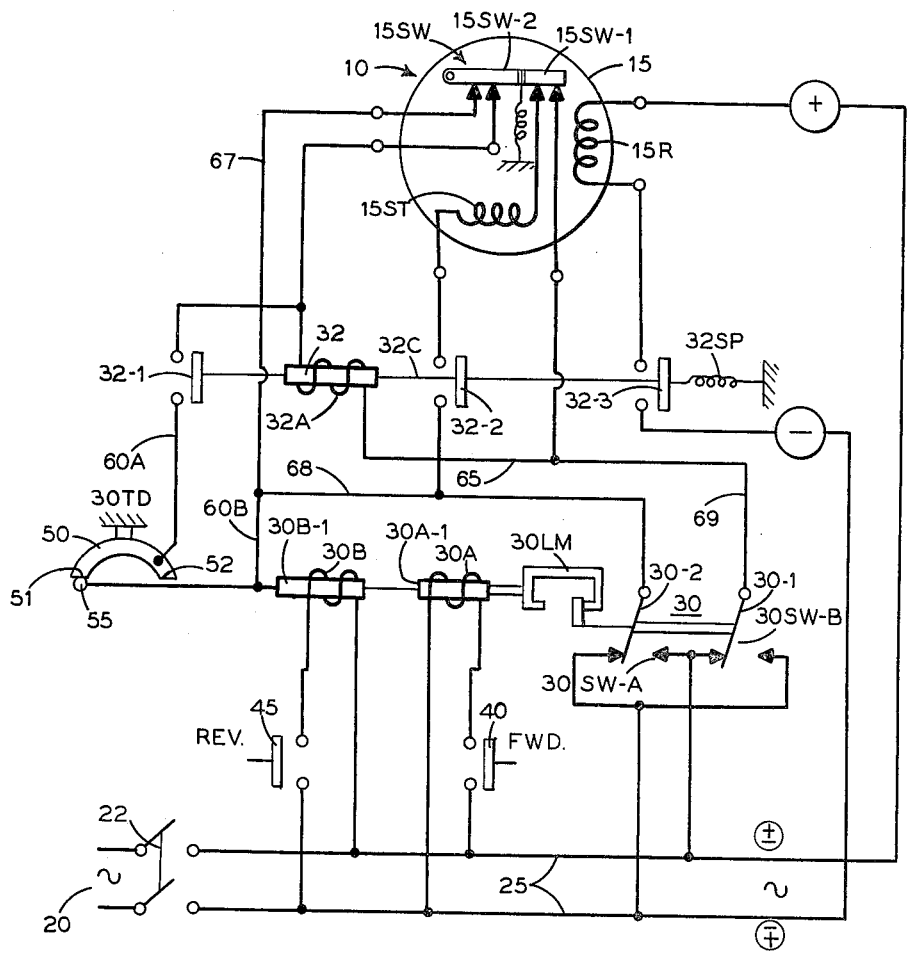

Dec. 14, 1965  H. GREENWALD  3,223,910
REVERSING SYSTEMS FOR SINGLE PHASE MOTORS
Filed Oct. 8, 1962  2 Sheets-Sheet 1

*INVENTOR.*
Harry Greenwald
BY
ATTORNEY

Dec. 14, 1965   H. GREENWALD   3,223,910
REVERSING SYSTEMS FOR SINGLE PHASE MOTORS
Filed Oct. 8, 1962   2 Sheets-Sheet 2

INVENTOR.
Harry Greenwald
BY
ATTORNEY

United States Patent Office 3,223,910
Patented Dec. 14, 1965

3,223,910
REVERSING SYSTEMS FOR SINGLE PHASE MOTORS
Harry Greenwald, Whitestone, N.Y., assignor of one-third each to Louis Wolff and Harry Silberglait, Brooklyn, N.Y.
Filed Oct. 8, 1962, Ser. No. 228,856
8 Claims. (Cl. 318—207)

This invention relates to reversing systems for single phase motors.

There are some applications where the use of a single phase motor is dictated because only single phase power circuits are available. For example, in the operation of home-type washing machines, usually only a single phase line is available in the home. For certain washing operations, it is desired that the motor rotation be periodically reversed. Also in certain types of machine operations, as in lathes, such reversal is desired.

A single phase motor is generally capable of rotating in either direction. The motor is provided with two windings, one a running winding and the other a starting winding. The starting winding can be energized in either direction to control the direction of rotation of the motor during starting. Thereafter, the starting winding can be disconnected and the motor will continue to operate in the same direction it started under the influence and control of the regular running winding.

The conventional practice is to energize the starting winding until the motor speed is brought up to the operating speed of the motor. A centrifugal switch is provided and arranged to be operated by the rotating part of the motor when the motor speed reaches a predetermined operating speed. Normally, the centrigugal switch is closed and serves to connect the motor starting winding to one terminal of the voltage supply that is to energize the motor windings. When such operating speed is reached, the centrifugal switch opens and opens the circuit of the starting winding since that starting winding has already accomplished its purpose in starting the motor in the appropriate direction as desired. Thereafter, only the running winding remains energized so long as the motor operation is desired.

When the direction of rotation of the motor is to be reversed, for the purpose of the operation that is desired, the motor must be de-energized in order to permit the rotor to reduce its speed to zero speed, in order that its direction of rotation may be then readily reversed.

When the motor is operating it is connected to a load that may be of any amount within the load capacity for which the motor is intended and capable of assuming. Thus, the load on the motor may vary from a small amount to a maximum amount sufficient to tax the full power capacity of the motor. The size or amount of the load connected to the motor will determine the inertia of the load connected to the motor. Thus, the inertia of the motor and its connected load may vary from the inertia of the motor plus a small load to a value including the inertia of the motor and a large load.

When the motor is thus operating with its load, the total inertia will determine the amount of time required by the motor and its load to come back down to zero speed, or rest, so that the motor may be safely energized to rotate in the opposite direction.

In order to allow sufficient time for the motor and its load to come to rest, conventional practice assumes that the load attached to the motor is the maximum that the motor can tolerate and take care of, and then provides for a time interval corresponding to the time that would be necessary for such a load connected to the motor to come to rest.

Therefore, a suitable timing device is adjusted to a time interval corresponding to such time that would be necessary for the motor and its maximum connected load to come to rest. Thus, according to conventional practice, when each reversing operation is to be inititated, this pre-set time interval is utilized to determine when it will be safe to connect the motor to the circuit in a manner to cause reverse rotation.

Obviously, such time interval presents the longest time interval that may ever be necessary to permit the motor and its connected load to come to rest. Also, in order to provide a safety factor, such pre-selected time interval must be somewhat longer than the actual time interval that will be required by the motor and its connected load to come to rest.

The load connected to the motor and driven by it in any one direction will not always be the maximum load which the motor can handle. During many operatons, the load may be considerably less than the maximum load which may be imposed upon the motor. Consequently, the actual time for the motor and its connected load to come to rest will be less than the arbitrary time interval adjustably predetermined according to conventional practice. Consequently, the motor will be kept at rest with the connected load during many unnecessary rest intervals, merely because the arbitrary time setting for a maximum load condition will be much greater than the actual time required for the load as then actually connected to the motor.

The object of the present invention is to provide a reversing system for such a single phase motor which will directly detect the time required for the motor and its connected load to come to rest, and thereupon operate immediately to establish the reversing operation of the motor.

Another object of the invention is to utilize an operating condition of the motor itself as a control for determining the correct time for establishing the circuit-reversing operations to reverse the direction of operation of the motor.

Aonther object of the invention is to utilize the standard conventional switch that is built into every single phase motor with a starting winding, and to utilize such centrifugal switch as a detector of the rest-condition of the motor, and as a control for the external switching equipment that establishes a reverse connection to the windings to cause a reversal of rotation of the motor.

In accordance with the principle of the present invention, the usual centrifugal starting switch is provided with an extra contact for controlling an external relay switch. The basic contact of the centrifugal starting switch is left in its usual operating condition which serves to open the circuit of the starting winding when the motor reaches operating speed. The centrifugal switch then stays open until the motor speed drops to zero and the motor comes to rest.

In the present invention, the auxiliary contacts on the centrifugal starting switch are utilized for the external relay which serves to disconnect either the starting winding only, or both windings, that is, the running winding as well as the starting winding of the motor, during the switching time interval while the circuit switching operations are performed that will establish reverse circuit connections to the motor windings.

In usual practice, the motor is controlled by a suitable external reversing switch to cause the motor to operate in forward direction or in reverse direction in a predetermined sequence, according to the operation to be performed by the motor.

In accordance with the present invention, one of the features thereof is to arrange for the disconnection of the windings, immediately prior to any switching operation that is performed to cause or to establish a re-arrangement of the circuitry for reversing the operation of the motor. Thus, the motor windings are disconnected from the power sources while the reversing switches are bing re-set to establish the changed circuitry which involves a subsequent application of reversed polarities to various points of the circuit affecting the energization of either or both windings.

Ordinarily, only the starting winding must be disconnected during the switching operation. In accordance with the precautionary features of the present invention, provision is also made to similarly disconnect the running winding during the switching operations when the polarity of the circuitry is reversed.

In accordance with the present invention, two modifications are shown for establishing motor reversing circuitry for a single phase motor.

The first modification utilizes a single external control relay with suitable means for assuring the de-energization of the relay immediately prior to any intended switching operation for establishing a reversing control. Thus, in this modification, the windings of the motor are assuredly disconnected before the switches are operated to establish a reversing circuitry.

In a second modification, two separate external relays are utilized to control the windings to establish the respective opposite directions of rotation in the motor, by suitably controlling the connection of the starting winding to the energizing power circuit.

Figure 2:
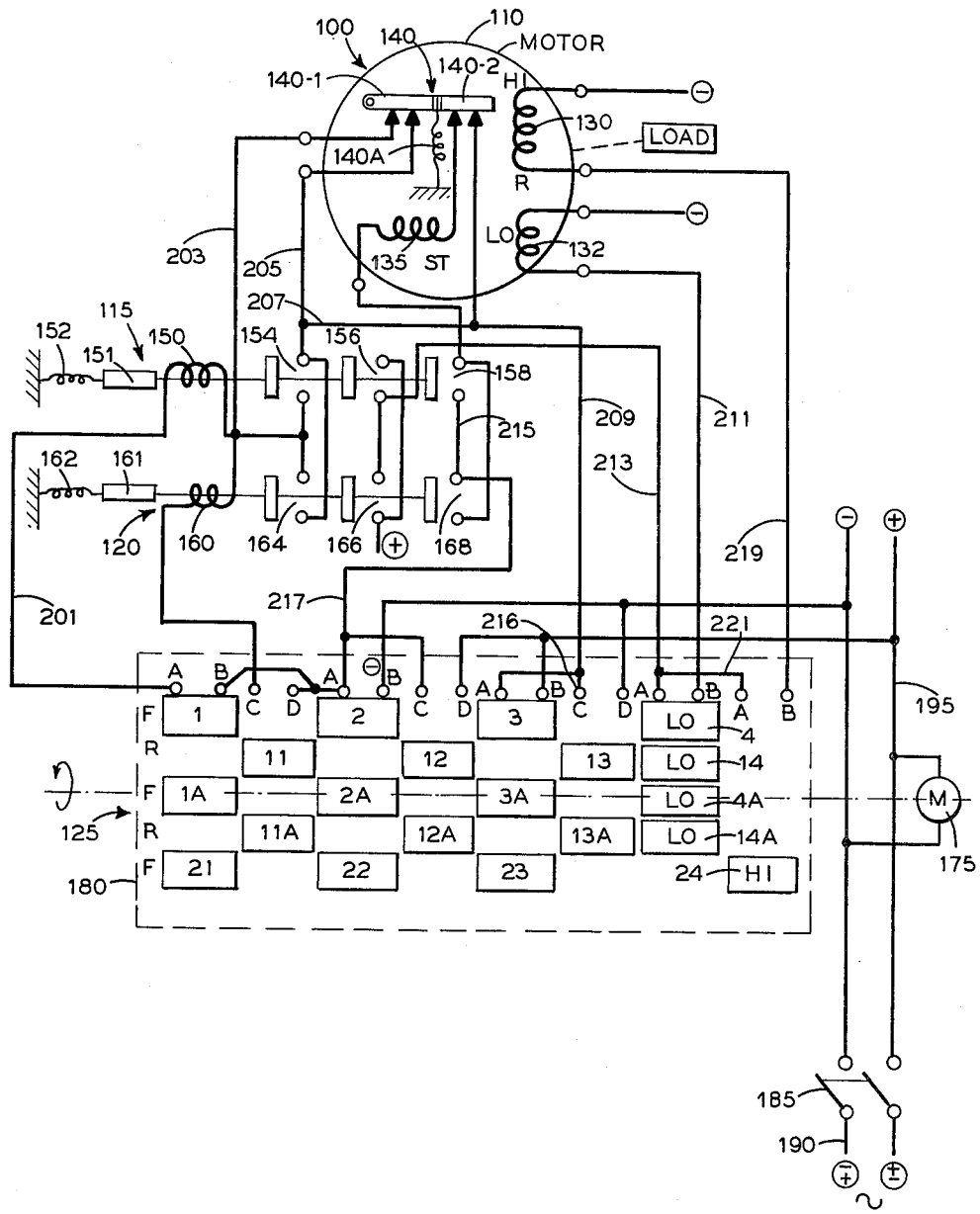

The manner in which the control circuitry for the motor and its windings is arranged, is described in the following specification, taken in connection with the accompanying drawings, in which:

FIGURE 1 is a simple schematic diagram of the circuitry and switching equipment for controlling the direction of rotation of a single phase motor, shown with a centrifugal switch modified to provide an additional contact as utilized in this system; and FIGURE 2 is also a schematic simplified diagram of a timing system for controlling a single phase motor to achieve both forward and reversal operations through a predetermined sequence pattern, with various elements and components illustrated to show functional operations rather than actual physical constructions.

As shown in FIGURE 1, a reversing system 10 for a single-phase motor 15 includes a power supply 20 from which energy is supplied through a main switch 22 to a local bus line circuit 25, from which energy is to be supplied to the motor 15 through a main reversing switch 30, in co-operation with a control relay 32 for controlling the excitation of the running winding 15R and the starting winding 15S$t$ of the motor 15.

In order that the description of the circuitry may proceed smoothly, cetrain elements of the several components including the motor, the reversing switch and the control relay will be first identified.

The motor 15 comprises the main winding 15R and the starting winding 15S$t$ previously referred to. In addition, the single-phase motor 15 includes a conventional centrifugal starting switch 15S$w$ which is spring-restrained to close two switch circuits in the rest position of the motor, and to open those circuits when the motor reaches a certain predetermined operating speed. The switch represented by 15S$w$–1 is the conventional switch built into a standard single-phase motor to control the starting winding by opening such starting winding after the motor attains a certain operating speed, and to reclose that winding when the motor comes back substantially to rest.

In the rest position when the motor is stationary, such standard centrifugal switch contacts are closed so that the starting winding circuit is then closed within the motor.

The second switch element labeled 15S$w$–2 represents an auxiliary switch or set of contacts mounted on the conventional switch 15S$w$, and is utilized herein for the special purpose of controlling a suitable relay switch external of the motor, in order to enable the relay switch to hold the starting winding to be safely held open while the reversing switching operating is being prepared. In the conventional single-phase motor, the starting winding connections may be suitably connected to the same terminals as the main running winding 15R, but in this application the terminals at the starting winding are brought out of the motor for independent connection to the power supply through the reversing switch 30.

The relay 32 for controlling the motor windings comprises a stationary operating coil 32A which operates in conventional fashion to move a core and switch assembly against the restraining force of a biasing spring that normally holds the core and assembly in position to hold the relay switch elements open. As here shown, the relay comprises three switch elements.

The relay 32 generally serves to disconnect the starting winding of the motor immediately before a switching operation is to be performed at the switch 30, and serves also to reconnect the starting winding to the reversing switch 30 after the reversing switch has been operated to establish reverse connection to the power supply.

The reversing switch 30 is arranged to be operated to either switching position through a suitable electro-magnetic actuating assembly, here shown for simplicity as consisting of two coils 30A and 30B, operating on respectively related cores 30A–1 and 30B–1.

The reversing switch 30 is shown in the forward energizing position for the motor, and the coil 30A is shown centered on its related core which is moved to such position when the coil 30A is energized from the local power supply line 25 through a forward push-button 40, which is shown as being normally in open position and which may be depressed to close the circuit to the coil 30A when the reversing switch 30 is to be moved to a position which will establish forward rotation of the motor when energized through such reversing switch 30.

When the motor is to be reversed and its energization consequently reversed by the reversing switch 30 being moved to its opposite position, the coil 30B is energized, through a suitable reversing button 45, whereupon the coil 30B will move its corresponding core to a central position within coil 30B .

The core assembly for actuating the reversing switch 30 includes two other elements that are merely schematically shown to illustrate the functions that they are to perform rather than to illustrate the actual detail constructions. As previously indicated, it is desired to disconnect and open the circuits of the two windings before the reversing switch 30 is repositioned for a subsequent reversal operation of the motor. Such circuit opening and disconnecting of the motor windings is desired before the operation of the reversing switch is initiated. To accomplish that sequential operation, the method employed in the present application is to control the relay in such manner, with a short lost-motion, as to open the circuits of the two windings immediately before the reversing switch 30 is actually operated. A suitable time interval may thus be established in various ways between the initiation of the reversing operation and the actual moment when the reversing switch 30 is actually actuated. For the purpose of the present description, the two elements, namely a time delay switch 30TD and a lost-motion element 30LM are illustrated.

The time delay element 30TD is illustrated as a contact element 50 having two polar contact surfaces 51 and 52, with a movable contact element 55 positioned to engage one or the other of the two polar contact faces 51 or 52, depending upon the position of the core assembly operated by the two windings 30A or 30B.

When the switch 30 is to be moved to its reverse position by operation of the push-button 45 to energize coil 30B, the core assembly will be moved to the right-hand side which will move the movable contact 55 from the polar contact surface 51 to the polar contact surface 52. In the movement from one terminal position engaging contact surface 51 to the other terminal position engaging contact surface 52, the movable contact 55 will be disengaged from the contact element 50, thus introducing a short time interval which may be only a fraction of a second, but that is sufficient to open the circuit between the two conductors 60A and 60B which represent part of the lock-in circuit for holding the relay coil 32A of the relay 32 energized to hold its switches closed.

During that short time interval, the core assembly moves the lost-motion element 30LM through a short distance which does not produce any motion on the main switch blades of the reversing switch 30. Near the end of the movement, however, the lost-motion element 30LM moves the reversing switch blades to engage the right-hand stationary contacts 30Sw–a and 30Sw–b. The operation of the system shown in FIGURE 1 may now be considered.

Assuming everything at rest, the motor is not operating and is at rest, and the switch 30 is in the position shown with the switch blades at the left-hand side stationary contacts, and the relay 32 is in the position shown with all of its relay switches open. The two push-button switches, forward switch 40 and the reversing switch 45, are both open and the main line switch 22 is open. The motor is now to be operated. The main power switch 22 is closed.

Upon closure of main switch 22, the local power line circuit 25 is energized. The forward switch 40 need not be closed since all of the equipment is in forward running position to begin. In the rest position shown, the centrifugal speed-responsive switch 15Sw is closed, in the position shown in FIGURE 1. The relay coil 32A is thereupon energized to move the relay 32 to closed position, with its three switches closed, against the biasing force of the biasing spring.

The relay coil circuit may be traced from top conductor of circuit 25 through right-hand switch blade 30–1 through conductor 65 through relay coil 32A through motor centrifugal switch 15Sw–2, thence through conductors 67 and 68 back to left-hand switch blade 30–2 of the reversing switch to the lower conductor of the local power circuit 25. Relay coil 32A is thereupon energized and the relay 32 operates to close its switches.

Relay switch 32–1 is connected in series with the time delay switch 30TD through conductors 60A and 60B to bridge the centrifugal switch 15Sw–2, in order to lock-in the relay circuit as a holding circuit when the motor centrifugal switch will subsequently open.

The operation of the relay 32 also closed its contact switch 32–2, whereupon the circuit to the starting winding of the motor was completed from the bottom conductor of the local power circuit 25 through the left-hand switch blade 30–2 of the reversing switch 30, through the relay contact 32–2 thence through the starting winding 15St of the motor, thence through the centrifugal speed-responsive switch 15Sw–1 and back through the conductor 69 to the right-hand switch blade 30–1 of the reversing switch to the top conductor of the power circuit 25. The starting winding is thereupon energized.

At the same time the relay operation 32 closed its switch 32–3 which connected the main running winding 15R of the motor across the two conductors of the local power circuit 25.

The motor is now energized in both windings and proceeds to rotate in the forward direction.

As soon as the motor reaches operating speed, the centrifugal switch 15Sw opens. Thereupon the circuit of the starting winding 15St is opened at the centrifugal switch element 15Sw–1. At the same time switch 15Sw–2 opens the circuit to the relay coil 32A, but the circuit of the relay coil remains closed through the relay lock-in switch 32–1 and the time delay switch 30TD connected between the two conductors 60A and 60B.

The motor now continues to operate in a forward direction until reversing operation is desired.

In order to achieve reverse operation of the motor, suitable pre-set control equipment may be provided. However, merely to illustrate the operation, the reversing switch 45 is closed, which serves to energize the operating coil 30B to move the core assembly towards the right. The switch contact 55 is thereupon moved away from the polar surface 51 of the switch element 50, and the holding circuit for the relay coil 32A is opened. The relay 32 is thereupon moved to its de-energized position by its biasing spring 32Sp and opens its three relay switches 32–1, 32–2 and 32–3. The first switch 32–1 opens the holding circuit for the relay coil 32A. The second switch 32–2 opens the circuit of the starting winding at a second point since the starting winding is already open at the centrifugal speed-responsive switch 15Sw. The third relay switch 32–3 opens the circuit of the main running winding of the motor 15R.

The motor and its connected load now gradually decelerate to rest position.

In the meantime, the operation of the core structure for the reversing switch 30 has continued, first, to move the switch contact 55 to the polar contact surface 52, and, contemporaneously therewith, has continued to move the lost-motion element 30LM to move the reversing switch blades 30–1 and 30–2 to their right-hand positions for connecting the starting winding of the motor to the power circuit 25 in reversed phase connection.

The subsequent desired reversing operation of the motor is now subject to the control of the centrifugal speed-responsive switch 15Sw of the motor. That switch 15Sw will return to its rest position only when the motor has reached rest position or is so close to rest position by reason of its relatively slow reduced speed, that no harm could come to the motor if the windings were then connected to the power circuit 25.

This feature of controlling the reversing connections of the motor windings immediately at such instant as the condition of the motor reaches a safe speed, either low speed or rest position, is the important feature of this invention.

Accordingly, when the centrifugal switch 15Sw recloses in response to the low speed of the motor or the return of the motor to rest at zero speed, the relay 32 is again energized from the power circuit 25 through the switch blades 30–1 and 30–2, through the conductors 65 and 68 and the centrifugal switch contact 15Sw–2. Relay 32 is not a polarized relay and therefore it is immaterial in which direction the relay coil 32A is connected to the power circuit 25.

The previous operation is now repeated. The relay closes its three switches 32–1, 32–2 and 32–3. The relay switch 32–1 again provides a locking circuit for the relay coil 32A. The switch 32–2 completes the circuit to the starting winding through the reversing switch 30, but with the terminals of the winding connected now to the opposite conductors of the power circuit 25. The third relay switch 32–3 connects the running winding 15R to the same conductors of the power circuit 25 as in the previous forward direction operation of the motor.

With the connection of the two windings to the power circuit through the relay switch 32–2 and 32–3, the motor windings are again energized and operate the motor, but in a reverse direction. As before, the operation of the motor will continue in its now reversed direction until a change of motor direction is desired. At such time, the forward switch 40 will be depressed, manually or by suitable control means, which will now tend to move the time-delay switch 30TD back towards its initial position, and, at the same time, after a certain amount of lost-motion, which will introduce the time delay, will operate the reversing switch back to the position previously had as indicated in FIGURE 1.

The two operating switches 40 and 45, switch 40 to control forward direction of the motor, and switch 45 to control reverse direction of the motor, have been shown here for simplicity as simple manually operable switches. It will be obvious and clearly appreciated that such switches 40 and 45 may be part of any suitable timing device that is operated to alternately and sequentially close the two switches for their respective short time intervals sufficient to initiate the operations as explained. Thus, the operation of the motor can be controlled to rotate in a forward direction for a desired period of time and then controlled to operate in a reverse direction for a desired period of time.

In each case, either the initial connection of the motor, or a subsequent re-connection of the motor, to the power circuit, will be controlled by the centrifugal speed-responsive switch of the motor as the safety device which will determine when the motor has decelerated to a speed at which the circuit connections may be re-established to cause a rotation of the motor in a direction reverse to that from which it has decelerated.

In the modification of the system just described as shown in FIGURE 1, the features of the time delay element at the switch 50 and the lost-motion element of the actuating means for the reversing switch 30, are illustrated schematically to show the functional operations to be achieved. Other constructions and arrangements obviously may be utilized to achieve the same functional operations.

A second modification of the invention is illustrated schematically in FIGURE 2. The modification shown in the diagram in FIGURE 2 is for controlling a single-phase motor having the usual starting winding, but also having a low-speed running winding and a high-speed running winding, either of which may be selectively controlled to operate the motor at the corresponding low or high speed, after the starting winding has been appropriately energized to bring the rotor up to such speed.

In this second modification, a timing switch is employed having a motor which is energized to drive and rotate a drum containing several contact-engaging segments, each disposed to engage a pair of stationary contact fingers to control an external circuit. Thus the motor can be controlled to perform a predetermined sequence of operations in accordance with a predetermined schedule of timing cycles.

In this modification, the system 100 comprises the motor 110 to be controlled, a pair of relays 115 and 120, respectively provided with an operating coil and a set of switches, and a motor-operated timing switch 125 comprising a motor and a drum rotatable thereby with drum segments arranged to be rotated into engagement with pairs of contact fingers for controlling external circuits in a predetermined schedule of sequential operations.

The motor 110 comprises a high speed running winding 130, a low speed running winding 132 and a starting winding 135. The motor 110 is also provided with a centrifugal switch 140 that is closed in the rest position of the motor to close two switch sections 140-1 and 140-2. When the motor reaches a predetermined speed, the centrifugal switch 140 overcomes the restraining force of a spring 140A and opens both switch sections 140-1 and 140-2.

The relay switch 115 includes an operating coil 150 which operates a core assembly 151 against the restraining action of a spring 152 to close three relay switches 154, 156 and 158.

The relay switch 120 similarly comprises an operating coil 160 which operates a core assembly 161 against a biasing restraining spring 162 to close three related switches 164, 166 and 168.

The motor-driven sequence timing switch 125 comprises a motor 175 and a drum indicated by the dotted outline 180 that is provided with several segments for controlling the motor in a forward direction and in a reverse direction, first, both forward and reverse at low speed, and then in a forward direction at high speed.

The drum provides the sequence control for the direction of rotation of the motor according to some predetermined sequence of operations. Obviously, the drum may be designed and arranged to provide any desired sequence of operations in the motor and its load.

The operation of the system as shown in FIGURE 2 may now be considered. The main power switch 185 is open, and when closed serves to connect an external power source 190 to the local power line 195 which serves to energize the system shown in FIGURE 2.

Although the system is an alternating current line, for convenience in following some of the circuitry and in order to designate the opposite lines of the power supply line 195, one conductor will be referred to as the positive line and the other as the negative line, and, similarly, certain terminal connections will be indicated as being connected to the line of either polarity with the understanding that the connection will go to the appropriate conductor of the supply line 195.

Upon closure of switch 185 and energization of the local line 195, the relay switch 115 is energized to establish rotation of the motor in a forward direction. With the sequence drum controller switch 125 in the position indicated, the motor will start at low speed.

The circuit to the coil 150 of the relay switch 115 may be traced from negative conductor of local supply 195 shown at contact finger 2B through drum contact 2 to contact finger 2A, thence through contact fingers 1B and 1A and drum contact 1, thence through conductor 201 to relay coil 150, through conductor 203 and centrifugal switch section 140-1 back down through conductor 205 and conductor 207 to conductor 209 to drum contact terminal 3A, thence through the drum contact 3 and terminal 3B to the positive conductor of the local power line 195. Relay coil 150 is thereupon energized and the relay operates to close its three switches 154, 156 and 158.

The first relay switch 154 closes to shunt the centrifugal switch contact 140-1, and locks the relay 115 in closed position by providing a closed locking circuit for the coil 150, even though the centrifugal switch 140 of the motor will soon open as the motor reaches appropriate speed.

The second relay switch 156 completes the circuit to the low speed running winding as follows: from negative terminal of the low speed winding 132, through the winding, down through conductor 211, through the fingers A and B and the LO drum contact 4, up through conductor 213 to and through the closed switch 156, to the plus symbol indicating a connection to the positive conductor of the local circuit 195. The low speed running winding 132 of the motor is thereupon energized.

It remains now merely to energize the starting winding 135 of the motor. The motor will then be accelerated to its low running speed, at which time the centrifugal switch 140 will open. The circuit to the starting winding may be traced from positive conductor of the local power supply line 195 through the contact fingers A and B and drum segment 3, upward through conductor 209 to the centrifugal switch segment 140-2, down through the starting winding 135 to the third closed relay switch 158, downward through conductors 215 and 217 to the fingers A and B and drum segment 2 to the negative conductor of the local supply line 195. The starting winding is thereupon energized and the motor accelerates to its normal low running speed.

The motor continues to rotate in a forward direction so long as the top row of contact fingers A and B at the respective drum segments 1, 2 and 3 and LO remain in contact with those fingers as the drum rotates. That time interval is determined by the peripheral width of the drum segment involved and the angular speed of the rotating drum.

As the sequence drum switch motor 175 continues to rotate the drum, the drum segments 1, 2 and 3 and LO disengage their respective A and B contact fingers. The relay switch 115 is thereupon de-energized and restored to its normal open position by the restoring spring 152, to open its three relay switches 154, 156 and 158. At this time, both the starting winding 135 and the low speed running winding 132 are open. The motor 110 and its load will now decelerate to zero speed and rest position.

The drum motor 175 continues to operate the drum 125. The disposition of the next set of drum contacts 11, 12 and 13 is such that they engage their sets of contact fingers C and D immediately after the drum segments 1, 2 and 3, and LO have passed and left their respective sets of drum fingers A and B. The two drum segments 12 and 13 set up a reversed circuit connection to the starting winding 135. The circuit to the starting winding is still open however, at the switches 158 and 168 of the two relays 115 and 120.

Relay switch 120 will now be energized upon reclosure of the motor centrifugal switch 140 at the contact 140–1, which will then complete the circuit from the negative conductor of the local supply 195 through the drum contact 13 and its fingers C and D, thence through conductor 216, conductor 209, conductor 207, conductor 205, switch 140–1, conductor 203 and the coil 160 of the relay switch 120, to the contacts C and D now bridged by the drum segment 11 and thence to the contact fingers C and D bridged by the drum segment 12 to the positive conductor of the local supply line 195.

The relay switch 120 is thereupon operated to close its three switches 164, 166 and 168. Switch 168 completes the circuit to the starting winding in reversed connection relative to the other relay switch 158. The motor thereupon starts to rotate in the reverse direction. Switch 166 will have completed the circuit to the low speed winding 132 through conductors 213 and 211 that are now electrically connected through contact fingers A and B and the drum contact 14. The relay switch 164 will have provided a lock-in circuit for the relay winding 160 through a connection to conductor 205 and conductor 203 to bridge the motor speed-responsive switch 140, at the terminal 140–1, which will open as soon as the motor attains its predetermined low speed value in the reverse direction.

The motor continues to rotatae in its reverse direction for the interval of time as predetermined by the length of the drum segment and the speed.

Upon completion of the period of reverse rotation, the motor is to be controlled for rotation in the forward direction again, which requires a reversal of the reversed operation. The continued movement of the drum moves the drum contacts 11, 12 and 13 and 14 beyond and away from their contact fingers C and D for the drum segments 11, 12 and 13 and beyond the contact fingers A and B for the drum segment 14. Thereupon, the circuit of the relay coil 160 is opened by the drum segments 11 and 12, whereupon the relay switch 120 is restored to its open position by its restraining and returning spring 162.

The circuit of the starting winding is thereupon opened at the relay switch 168, although the starting winding had already previously been opened by its own speed-responsive switch 140 at the switch element 140–2. The low speed winding 132 is also opened by the relay switch 166 and by the drum segment 14 passing beyond its contact fingers A and B.

Continued operation of the drum motor 175 now moves the drum segments 1A, 2A, 3A and 4A into engagement with their respective contact fingers A and B for forward operation. All of the circuitry is thereupon re-established to energize and operate the relay switch 115 and to set up the circuit to the low speed winding 132. Nothing happens, however, until the motor and its connected load decelerate to zero speed or to such reduced speed as will permit the centrifugal switch 140 to reclose.

Thereupon, reclosure of the speed-responsive centrifugal switch 140 completes the circuit to the two relay windings 150 and 160, but since only the winding 150 of the relay 115 is completely closed at the contact fingers A and B and the bridging drum segment 1A and the segment 2A, only relay switch 115 recloses.

The motor now rotates in its forward direction of rotation until the expiration of the time interval as determined by the speed of the drum controller and the disposition of the drum controller contact segments. When the forward rotation interval is completed, the drum segments 1A, 2A, 3A and 4A will open the circuits between their respective contacts A and B, to de-energize the relay switch 115, which will be thereupon returned to its open position. At the same time, the drum segments 11A, 12A, 13A and 14A will engage their associated contact fingers to establish the circuitry for the reversing relay switch 120 and the relay switch 120 will be operated to re-establish the reversing circuit in the starting winding 135 together with the re-establishment of the circuit through the low speed running winding 132 at the drum contact segment 14A, to establish reverse operation of the motor.

At the end of that reverse operating interval, the motor is then to be operated in a forward direction at high speed. That requires a reversal of the starting winding connections again, and a transfer of power connections from the low speed winding 132 to the high speed winding 130.

As the drum motor rotates its drum segments 11A, 12A, 13A and 14A beyond their respective contact fingers, the high speed forward running contact segments 21, 22, 23 and 24 will be moved into engagement with the contact fingers A and B along the top contact line. The contact segments 21, 22 and 23 will thereupon operate as did the contacts 1, 2 and 3, to establish energization of the forward relay switch 115 to establish connection of the starting winding in proper direction for forward rotation of the motor. At the same time, the drum segment 24 will complete circuit at its contact fingers A and B to complete the circuit of the high speed running winding 130 from the negative conductor indicated at the top of the winding 130 through conductor 219, through drum segment 24, then conductor 221, conductor 213, relay switch 156, to the positive conductor of the local power circuit 195.

The motor is now energized with the high speed running winding and with the motor starting winding for forward direction of rotation. That operation will continue for the duration of time as determined by the lengths of the drum segments 21, 22, 23 and 24.

Upon completion of that sequence of operation, the main switch 185 is opened and the entire system is restored to deenergize rest position. The switch 185 is shown as a manual switch, but may be part of the automatic switching system.

Thus by means of an auxiliary switch contact on the centrifugal speed-responsive switch of the motor, for use in controlling an external circuit, in conjunction with the opening of the starting winding by the centriufgal switch main contact, auxiliary circuitry is controlled to provide an automatic detection of proper conditions in the motor, to permit a reversal of circuitry connections to establish reverse operation of the motor. By thus relying upon the speed of the motor, itself, instead of relying on arbitrary timing devices external of the motor, a true indication of the motor condition is obtained which permits appropriate switching of reversing circuitry, without arbitrarily extending such waiting time, merely as a safety factor, because of the lack of knowledge of the actual condition of the motor and its connected load.

It will be obvious that the circuitry may be re-arranged to permit various sequences of operation, all within the spirit and scope of the invention as defined in the appended claims. Also, that timing sequences and intervals may be predetermined by dimensions and arrangements of the drum controller segments and the contact fingers to be controlled thereby.

What is claimed is:

1. A reversing system for a single phase motor having a running winding, a starting winding and a speed-responsive switch normally closed below a predetermined motor speed and arranged to open when the motor speed reaches or exceeds said speed, said system comprising
   a source of alternating voltage for energizing the two motor windings to cause operation of the motor;
   a reversible main power switch for connecting the source to energize said reversing system;
   a relay having a coil connected to the source of voltage through the speed-responsive switch of the motor and said main power switch;
   and individual switch means controlled by the relay for connecting the respective motor windings individually to said source of voltage under proper speed conditions as determined by the speed-responsive switch of the motor in closed position.

2. A reversing system for a single-phase motor, as in claim 1, including additionally,
   means controlled by said reversible switch for reversing the connection of the motor starting winding to said source of alternating voltage.

3. A reversing system for a single-phase motor, as in claim 2, including, additionally,
   means for operating the reversing switch to reverse the connection of said starting winding to said voltage source;
   means controlled by said relay for establishing a lock-in circuit for said relay;
   and means controlled by said reversing switch operating means for de-energizing the relay coil by opening said lock-in circuit immediately prior to operating said reversing switch.

4. A reversing system for a single-phase motor, as in claim 1, in which
   the relay coil circuit is initially energized through the speed-responsive switch of the motor;
   and a relay switch paralleling the speed-responsive switch is operated by the relay to lock the relay in closed position.

5. In a reversing system for a single-phase motor having a running winding, a starting winding and a speed-responsive switch, the combination with said motor starting winding,
   of a reversing switch selectively operable for connecting an outside power supply source to said starting winding to selectively cause rotation of the motor in either selected direction;
   a relay having a switch connected to control a circuit for connecting the starting winding to said reversing switch;
   and means for operating the reversing switch, said means including anticipating means operable by said reversing switch operating means for opening the relay switch to disconnect the starting winding from the reversing switch immediately prior to an intended operation of the reversing switch.

6. In a reversing system, the combination as recited in claim 5, in which said anticipating means for opening said relay switch includes advance-operable time-switch means for de-energizing the relay switch and operable with and in advance of said reversing switch, said time-switch means being operable to first open said relay switch means, and said switch-operating means acting to cause operation of said reversing switch.

7. A reversing system for a single-phase motor having a starting winding and a speed-responsive switch normally closed and arranged to open when the motor attains a predetermined speed; said system comprising
   a reversing switch to selectively connect the starting winding to an outside power supply in one of two alternate directions to cause motor starting and rotation in a selected direction;
   relay switch means having an operating coil and a switch, the operating coil being connected in an energizing circuit controlled by said speed-responsive switch of the motor;
   said relay switch being in series circuit with and cooperative with the speed-responsive switch of the motor for disconnecting the starting winding from said power supply when the reversing switch is to be operated to reverse the direction of rotation of the motor, and said relay switch means serving also to prevent reconnection of the starting winding for reverse energization until the speed-responsive switch is reclosed upon motor speed reduction to a predetermined safe value and until the speed-responsive switch completes the energizing circuit for said relay coil.

8. A motor reversal system for a single-phase motor having a high-speed winding, a low-speed winding and a starting winding, with a speed-responsive switch for opening the starting winding after the motor attains a predetermined speed, said system comprising in combination with said motor,
   a motor-driven drum-type controller switch for selectively controlling the energization of the two running windings and of the starting winding to operate the motor according to a predetermined sequence pattern involving reversals of the motor;
   relay-switch means connected between the drum controller switch and the starting winding for establishing reversing connections to the starting winding;
   and means controlled by the motor speed-responsive switch for controlling an energizing circuit to said relay-switch means and serving to prevent energization and operation of said relay-switch means from establishing a reversed connection of said starting winding until the motor speed is reduced to a predetermined value at which said speed-responsive switch closes.

References Cited by the Examiner
UNITED STATES PATENTS 2,380,270   7/1945   Suhr.
2,664,532   12/1953  Lewus.
2,743,406   4/1956   London.

ORIS L. RADER, *Primary Examiner.*

C. E. ROHRER, G. A. FRIEDBERG,
*Assistant Examiners.*